United States Patent
Gurr et al.

(10) Patent No.: US 9,525,360 B2
(45) Date of Patent: Dec. 20, 2016

(54) CAPACITOR POWER SUPPLY UNIT FOR SMALL ELECTRICAL LOADS WITH A HIGH CURRENT REQUIREMENT

(71) Applicant: Andreas Stihl AG & Co. KG, Waiblingen (DE)

(72) Inventors: Kay-Steffen Gurr, Heilbronn (DE); Gernot Liebhard, Waiblingen (DE); Rene Wichert, Durlangen (DE); Rudolf Saemann, Balingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 53 days.

(21) Appl. No.: 14/708,007

(22) Filed: May 8, 2015

(65) Prior Publication Data

US 2015/0326138 A1 Nov. 12, 2015

(30) Foreign Application Priority Data

May 9, 2014 (DE) ........................ 10 2014 006 894

(51) Int. Cl.
| | |
|---|---|
| *G05F 1/12* | (2006.01) |
| *H02M 7/06* | (2006.01) |
| *H02M 7/04* | (2006.01) |
| *H02M 7/08* | (2006.01) |
| *H02M 7/10* | (2006.01) |

(52) U.S. Cl.
CPC .................. *H02M 7/06* (2013.01); *H02M 7/04* (2013.01); *H02M 7/08* (2013.01); *H02M 7/103* (2013.01)

(58) Field of Classification Search
CPC .. G05F 1/12; H02M 7/155; H02M 2001/0087; Y02B 70/126
USPC ........... 363/16, 17, 37, 48, 86, 89, 146, 132; 323/207, 222, 224, 282, 299, 310
See application file for complete search history.

(56) References Cited

U.S. PATENT DOCUMENTS

| | | | | |
|---|---|---|---|---|
| 4,831,508 | A * | 5/1989 | Hunter ................ | H02M 1/4208 363/126 |
| 4,910,654 | A * | 3/1990 | Forge .................... | H02H 9/001 323/908 |
| 5,287,263 | A * | 2/1994 | Shilo .................... | H02H 9/001 323/908 |
| 5,539,300 | A * | 7/1996 | Mathieu ................ | G05F 1/12 323/249 |
| 5,661,348 | A * | 8/1997 | Brown ................ | H02M 1/4208 307/43 |

\* cited by examiner

*Primary Examiner* — Rajnikant Patel
(74) *Attorney, Agent, or Firm* — Walter Ottesen, P.A.

(57) ABSTRACT

A capacitor power supply unit converts a mains voltage (U) into a lower operating voltage ($V_1$) for a controller and a supply voltage ($V_2$) for an electrical small load. A series circuit including a mains capacitor and a zener diode is connected to the mains voltage (U) whereat the supply voltage ($V_2$) for an electrical small load having a permissible operating voltage is tapped off. The capacitor power supply unit provides for the supply voltage ($V_2$) to be greater than the permissible operating voltage of the electrical small load and for the small load to be connected to the supply voltage ($V_2$) via a buck converter. Here, the buck converter is controlled as a current source having a variable operating frequency.

12 Claims, 2 Drawing Sheets

CAPACITOR POWER SUPPLY UNIT FOR SMALL ELECTRICAL LOADS WITH A HIGH CURRENT REQUIREMENT

CROSS REFERENCE TO RELATED APPLICATION

This application claims priority of German patent application no. 10 2014 006 894.3, filed May 9, 2014, the entire content of which is incorporated herein by reference.

FIELD OF THE INVENTION

The invention relates to a capacitor power supply unit for converting a mains voltage into a lower supply voltage for a controller and small electrical loads.

BACKGROUND OF THE INVENTION

Capacitor power supply units form power supply units of simple construction for directly deriving the operating voltage needed for electronics from the mains voltage without the need for transformers or DC isolation. A series circuit comprising a mains capacitor, a series resistor and a rectifier diode is directly connected to the mains voltage, in which case a desired operating voltage which is used to operate a controller and/or a small electrical load is tapped off via a zener diode and preferably a smoothing capacitor, for example. In this case, the operating voltage derived from the mains voltage should be adapted to the permissible operating voltage of the small load.

One disadvantage of such capacitor power supply units is that the maximum output current of the power supply unit is predefined by the specific components of the capacitor power supply unit. Mains capacitors, for example so-called X2 capacitors, used in the capacitor power supply unit allow only low output currents of the power supply unit on account of their high reactance, with the result that, in addition to a controller or similar microprocessor, for example, additional small loads with a higher power requirement cannot be readily operated from the capacitor power supply unit. Such a small load may be an optical display, for example an optical display in the form of an LED. If the operating current of the LED is too low, the LED does not emit light or emits only very weak light, with the result that the optical display can scarcely be seen by the user, in particular in daylight.

SUMMARY OF THE INVENTION

It is an object of the invention to provide a capacitor power supply unit of the type described above in such a manner that a supply voltage is provided for small loads. This supply voltage can also be used to reliably supply small loads having a greater power consumption.

The supply voltage for the small load which is provided by the capacitor power supply unit is configured to be greater than the permissible operating voltage for the small electrical load and therefore cannot be readily applied to the small load. According to the invention, the supply voltage is connected to the small load via a buck converter, the buck converter being controlled by the controller as a current source with a variable operating frequency. The permissible operating current of the small load can therefore be set in a simple manner.

The essence of the invention lies in a combination of a plurality of features which results in the stated object being achieved. The supply voltage derived from the capacitor power supply unit is first of all increased and is selected to be at least considerably greater than the permissible operating voltage of the small load to be connected. In order to now connect the small load to the excessively high supply voltage, use is made of a buck converter which preferably freely oscillates. The buck converter is switched on and off by the controller, in which case such an operating frequency is set that non-destructive operation of the small load is reliably possible at the excessively high supply voltage. In this case, the buck converter can be operated by the controller as a current source for the small load.

According to a feature of the invention, the voltage source is operated with such a supply voltage that the energy provided by it is sufficient to supply all connected small loads. An increase in the supply voltage—even with a current that remains the same—leads, as a result, to a higher available power ($P=U \cdot I$), with the result that sufficient energy for proper operation is available for all small loads connected to the voltage source. It is possible to increase the operating current of the individual loads by means of the conversion using a switched mode power supply—using a buck converter in the embodiment.

In particular, the buck converter is operated as a constant current source adapted to the small load, that is, the current is set to an expedient, permissible operating current of the small load. In this respect, the current flowing through the small load is recorded and evaluated in a simple manner. The current flowing through the small load is expediently recorded and compared with a reference current using a comparator. If the reference current is exceeded, the comparator will open an electronic switch arranged in the circuit of the small load; if the reference current is undershot, the switch is closed. Therefore, the electronic switch in the circuit of the small load is opened and closed by the comparator on the basis of the recorded current which is actually flowing, with the result that a medium current is set which corresponds to the permissible operating current of the small load. The buck converter is connected in combination with the comparator as a type of control loop.

Since the capacitor power supply unit is used to operate a controller, a comparator present in the controller can be used to switch the buck converter. The electronic effort needed to operate the small load can therefore be kept low.

In order to attenuate the current changes which occur, a coil is arranged in the circuit of the small load. The coil is electrically in series with the small load.

In order to record the current in the circuit of the small load, a shunt resistor is expediently provided for the purpose of measuring the current. The potential of the shunt resistor is compared, using the comparator, with a reference voltage that is proportional to a permissible operating current of the small load.

The buck converter can be operated as a switch which is controlled by the controller and is intended to switch the small load on or off. Since the buck converter is switched on and off anyway in order to control the operating current, it is also possible to permanently switch off the small load by setting the reference value (for example a reference value of zero). An additional switch for the small load is therefore not required.

The small load is expediently an optical display, in particular an LED. The LED is operated with a constant current, as a result of which any desired brightness can be easily set. The comparator can be used not only to switch the LED such that it permanently emits light but also to operate the LED such that it flashes. For flashing, the output signal from the comparator for switching on the electronic switch can be delayed, for example.

An operating voltage for the controller is tapped off at a second zener diode in series with the mains capacitor, the operating voltage being adapted to the configuration of the controller, in particular to the permissible operating voltage of the controller.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
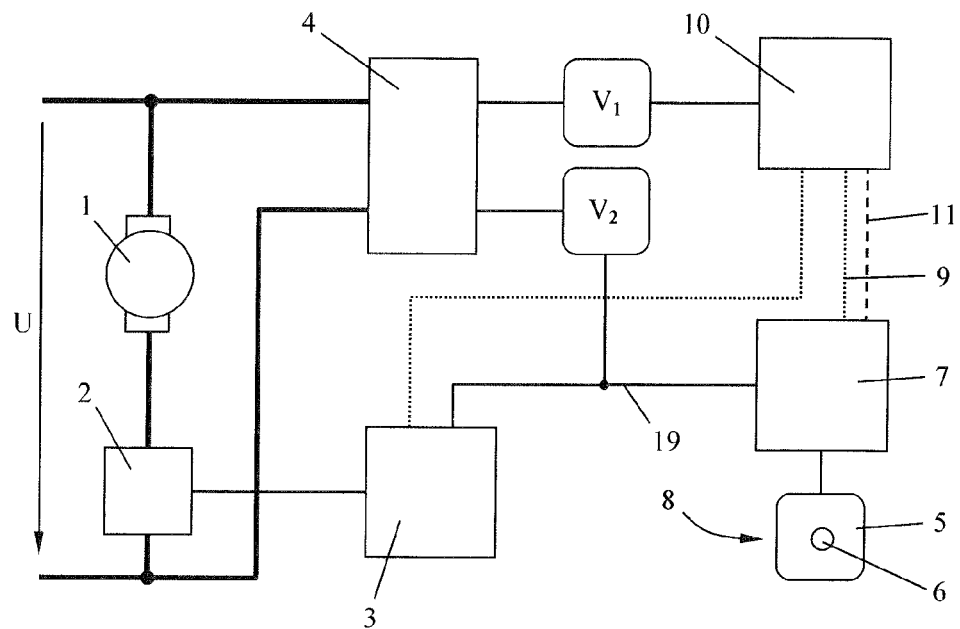
FIG. 1 is a schematic of a circuit for operating an electrical drive motor.

The electrical drive motor 1 shown in FIG. 1 is a so-called universal motor, preferably a single-phase series motor. The electrical drive motor 1 is in series with a power output stage 2 which contains switching elements such as triacs or the like for starting up the universal motor. The series circuit comprising the drive motor 1 and the power output stage 2 is connected to a mains voltage U.

The electronic switching elements of the power output stage 2, triacs in the embodiment, are operated by a drive unit 3 which impresses a negative firing current in order to fire the triacs. The temporal sequence in which the triacs of the power output stage 2 are fired is monitored by a controller 10, for example by a microprocessor.

A capacitor power supply unit 4 is provided in order to provide an electrical operating voltage for the controller 10, on the one hand, and in order to provide a supply voltage for the drive unit 3 for the triacs of the power output stage 2, on the other hand. The capacitor power supply unit 4 provides the—in particular positive—operating voltage $V_1$ for the controller 10 provided in the form of a microprocessor and the—in particular negative—supply voltage $V_2$ for the drive unit 3 for the power output stage 2.

Figure 2:
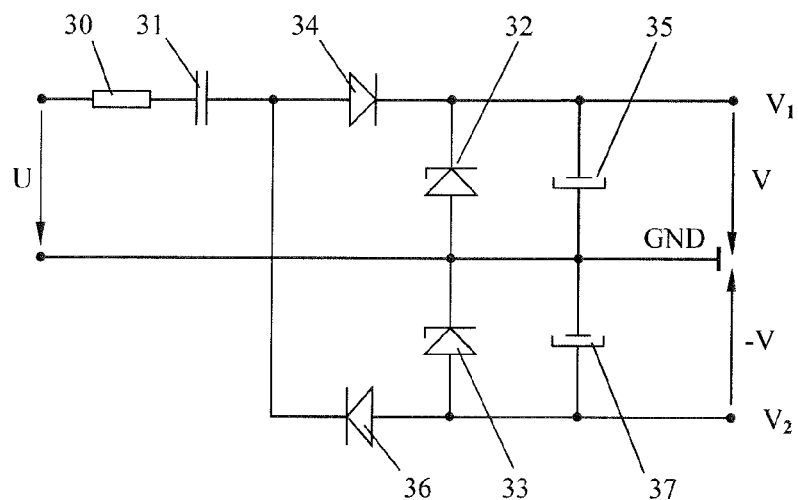
FIG. 2 is a schematic of a basic circuit diagram of a capacitor power supply unit; and, FIG. 3 is a schematic of a basic circuit diagram of a buck converter which is driven by a comparator and is provided to operate an optical display.

FIG. 2 illustrates the basic structure of such a capacitor power supply unit 4. It includes substantially a series circuit comprising a mains capacitor 31 and a zener diode 32 which are connected to the mains voltage U forming an AC voltage. A non-reactive load resistor 30 and a rectifier diode 34 for a half-wave of the mains voltage U are added in series with the mains capacitor 31. A capacitor 35 is connected in parallel with the zener diode 32. In a manner corresponding to the arrangement of the rectifier diode 34, the zener diode 32 and the capacitor 35, a further electrical branch is provided in parallel and consists of a rectifier diode 36 which is reverse-connected in parallel with the first rectifier diode 34 and is connected to the mains voltage U via a further zener diode 33 and a capacitor 37 in parallel with the zener diode 33 via the mains capacitor 31.

The capacitors 35 and 37 are preferably electrolytic capacitors or ceramic capacitors and are used both to smooth the voltages $V_1$ and $V_2$ and to store energy for bridging a blocked half-wave. The positive operating voltage $V_1$ is tapped off at the capacitor 35; the negative supply voltage $V_2$ is tapped off at the capacitor 37. The zener diodes 32 and 33 are configured in a manner corresponding to the desired voltages $V_1$ and $V_2$. In the embodiment, the zener diode 32 has a breakdown voltage at the level of the operating voltage $V_1$, for example 5 volts. In the embodiment, the zener diode 33 has a breakdown voltage at the level of the supply voltage $V_2$, for example 16 volts.

The operating voltage $V_1$ is a positive voltage V; the supply voltage $V_2$ is a negative voltage −V.

Owing to the configuration, a capacitor power supply unit, as schematically illustrated in FIG. 2, can be used to provide only a limited output current at the corresponding voltage source, for example an output current of approximately 10 mA.

If, in addition to supplying voltage to the controller 10, such a capacitor power supply unit 4 is intended to be used to drive an optical display 5 (FIG. 1), for example an LED 6, a capacitor power supply unit 4 quickly reaches its power limit. Approximately 20 mA at 3 volts are needed to operate an LED 6, with the result that a capacitor power supply unit 4 can only inadequately cover the energy supply for the small electrical load 8, an LED 6 in the embodiment shown, since the provided power at 3 volts is only 30 mW, but 60 mW are required for proper operation of the LED 6.

The invention now provides for the voltage source to be operated with such a supply voltage $V_2$ that the energy provided by the voltage source is sufficient to adequately supply one or even more connected small loads 8 with energy. Increasing the supply voltage $V_2$—even with a current that remains the same—provides a higher available power P=U·I as a result, such that sufficient energy for proper operation is available for one or all small loads connected to the voltage source of the supply voltage $V_2$. Since the supply voltage $V_2$ may be higher than the permissible operating voltage of a small load 8, the small load 8 is connected to the voltage source via a buck converter 7. Converting the voltage using a switched mode power supply—using the buck converter 7 in the embodiment shown—makes it possible to set the operating current in a manner adapted to the small load 8, which operating current may be higher than the possible supply current of 10 mA, for example, from the capacitor power supply unit 4. A connected small load can therefore also be operated with an operating current of higher than 10 mA. A plurality of small loads 8 are connected to the voltage source $V_2$ via corresponding buck converters 7, with the result that an adapted operating current can be set for each load.

In the embodiment shown, provision is made for the zener diode 33 for the negative supply voltage $V_2$ in the capacitor power supply unit 4 to be configured in such a manner that a supply voltage is provided which is higher, preferably several times higher, than the permissible operating voltage of the small load, for example, that is, several times higher than that permitted for the operation of an LED 6 in the embodiment shown. The supply voltage $V_2$ may be selected to be 3 times to 5 times greater than the permissible operating voltage of the small load, for example, that is, 3 to 5 times higher than the permissible operating voltage of the LED 6 of the optical display 5 in the embodiment shown. The buck converter 7 is provided in order to make it possible to operate the optical display 5 or the LED 6 at the impermissibly high supply voltage $V_2$ and is preferably controlled as the current source for the small load 8. The buck converter 7 is shown in the block diagram in FIG. 1. The buck converter 7—preferably a switch provided in the buck converter 7—is controlled by the controller 10 via a control line 9; the current I flowing in the buck converter 7 is communicated to the controller 10 via a feedback line 11.

The supply voltage $V_2$ is connected to the small load 8 via the buck converter 7; in the embodiment shown, the LED 6 of the optical display 5 is operated with the supply voltage $V_2$.

Figure 3:
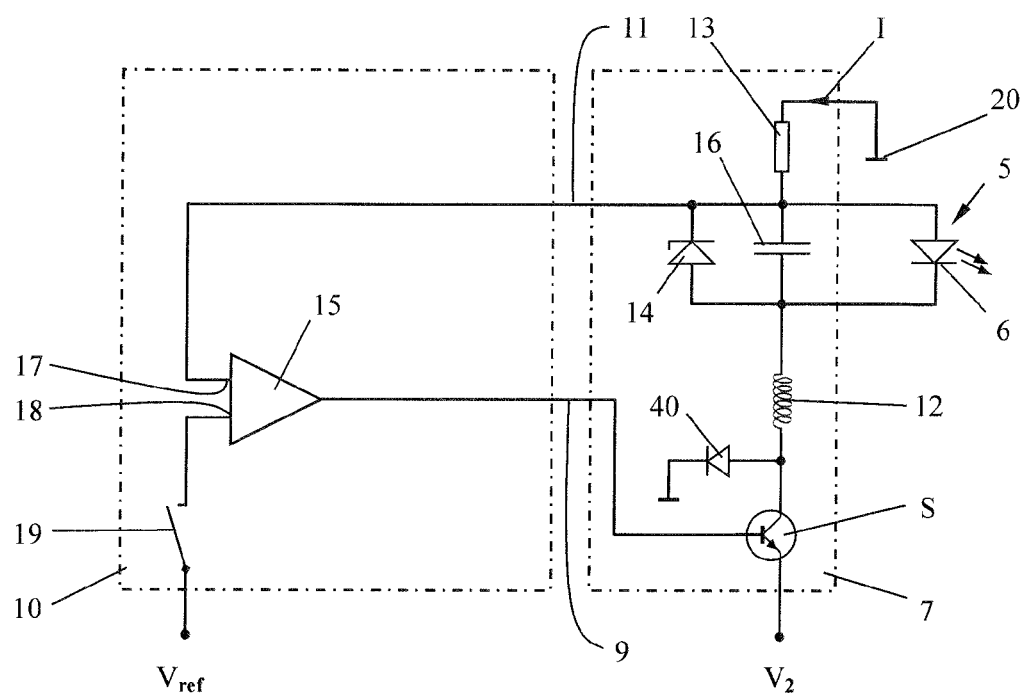

FIG. 3 schematically portrays the buck converter 7. The small load, the LED 6 of the optical display 5 in the embodiment shown, is connected to the negative supply voltage $V_2$ via a coil 12 and an electronic switch S; the LED 6 is connected to ground 20 via a shunt resistor 13. A buffer capacitor 16 and a zener diode 14 are each connected in parallel with the LED 6. The breakdown voltage of the zener diode 14 is selected, for example, in accordance with the permissible operating voltage of the LED 6; the breakdown voltage of the zener diode 14 is expediently somewhat below the permissible operating voltage of the LED 6. A freewheeling or flyback diode 40 is provided between the coil 12 and the electronic switch S. The flyback diode 40 is connected to ground in the flow direction, that is, the cathode of the flyback diode 40 is connected to ground.

The buck converter 7 is connected to a comparator 15 preferably present in the controller 10 or the microprocessor via the control line 9 and the feedback line 11. The control line 9 forms the output of the comparator 15; the feedback line 11 is connected to a first input 17 of the comparator 15. A reference voltage $V_{ref}$ is connected to the second input 18 of the comparator 15, preferably via a switch 19. The switch 19 is expediently a software switch of the controller 10.

The voltage potential at the shunt resistor 13 is supplied to the comparator 15 via the feedback line 11; the voltage potential at the shunt resistor 13 is proportional to the operating current I through the LED 6.

The reference voltage $V_{ref}$ connected to the second input 18 corresponds, for example, to a maximum permissible operating current I which is intended to be supplied to the LED 6 via the buck converter 7. If the potential at the first input 17 is smaller than the reference voltage $V_{ref}$ connected to the second input 18 via the closed switch 19, the comparator 15 will turn on and will actuate the switch S, with the result that the high negative supply voltage $V_2$ is connected to the LED 6. In this case, the buffer capacitor 16 is charged and—if the permissible operating voltage is reached—a further voltage rise at the buffer capacitor 16 is prevented as a result of the zener diode 14 turning on. The current I flowing through the LED 6 increases until the voltage tapped off at the shunt resistor 13 reaches the magnitude of the predefined reference voltage $V_{ref}$; the comparator 15 will then open the switch S in order to prevent a further current rise. The current I becomes smaller when the switch S is open; as a result, the voltage potential applied to the input 17 falls below the reference voltage $V_{ref}$ with the result that the comparator 15 turns on again and closes the switch S. As a result, a freely oscillating buck converter 7 is obtained, which buck converter can also be used to operate an optical display such as an LED 6 or other small loads 8 with the required operating currents without the permissible output current of the capacitor power supply unit 4 being exceeded.

Since the reference voltage $V_{ref}$ is connected via a switch 19 controlled by the controller 10, it is possible to switch the LED 6 on and off by opening and closing the switch 19 without a mechanical switch additionally being required.

If an operating frequency of the buck converter 7 is predefined by the controller 10, the brightness of the LED 6 can be set in any desired manner and even flashing of the LED 6 be effected. In addition, the circuit according to the invention makes it possible to operate more than only one small load with the supply voltage $V_2$, for example in an intermittent manner. The brightness of the LED 6 can also be set at will by predefining the reference voltage $V_{ref}$.

It is understood that the foregoing description is that of the preferred embodiments of the invention and that various changes and modifications may be made thereto without departing from the spirit and scope of the invention as defined in the appended claims.

What is claimed is:

1. A capacitor power supply component for converting a mains voltage (U) into a low operating voltage ($V_1$) for a controller and supply voltage ($V_2$) for an electric small load having a permissible operating voltage, the capacitor power supply component comprising:
   a series circuit connected to said mains voltage;
   said series circuit including a mains capacitor and a zener diode;
   said zener diode being configured so as to permit said supply voltage ($V_2$) to be tapped thereat for said electric small load having said permissible operating voltage;
   said supply voltage ($V_2$) being greater than said permissible operating voltage;
   a buck converter;
   said electric small load being connected to said supply voltage ($V_2$) via said buck converter; and,
   said buck converter being configured to be controlled as a current source having a variable operating frequency.

2. The capacitor power supply component of claim 1, wherein said buck converter is controlled as a constant current source adapted to said small load.

3. The capacitor power supply component of claim 1, wherein a current (I) flows through said small load; and, said capacitor power supply component further comprises:
   detector means for detecting said current (I);
   a comparator for comparing said current (I) detected by said detector means to a reference value ($V_{ref}$);
   said small load is part of an electric circuit;
   a switch arrayed in said electric circuit; and,
   said comparator being configured to open and close said switch in dependence upon the detected current (I).

4. The capacitor power supply component of claim 3, further comprising a controller and said comparator being arranged in said controller.

5. The capacitor power supply component of claim 1, wherein a current (I) flows through said small load; said small load is part of an electric circuit; and, a coil is arranged in said electric circuit for attenuating said current (I).

6. The capacitor power supply component of claim 1, wherein said small load is part of an electric circuit; and, a shunt resistor is arranged in said electric circuit for measuring current.

7. The capacitor power supply component of claim 1, further comprising a controller; and, said buck converter is operated as a switch controlled by said controller to switch said small load in and out.

8. The capacitor power supply component of claim 1, wherein said small load is an optical display.

9. The capacitor power supply component of claim 8, wherein said optical display is an LED.

10. The capacitor power supply component of claim 1, wherein said zener diode is a first zener diode; and, said capacitor power supply component further comprises a controller and a second zener diode connected in series with said mains capacitor; and, said operating voltage ($V_1$) is tapped off at said second zener diode.

11. The capacitor power supply component of claim 1, wherein said supply voltage ($V_2$) is multiple times greater than the permissible operating voltage of said small load.

12. The capacitor power supply component of claim 11, wherein said supply voltage ($V_2$) is three to five times greater than said permissible operating voltage.

* * * * *